US011081914B2

United States Patent
Kim et al.

(10) Patent No.: US 11,081,914 B2
(45) Date of Patent: Aug. 3, 2021

(54) STACK-TYPE STATOR USING MULTI-LAYER SUBSTRATE, SLIM MOTOR USING SAME, AND BLOWER FOR AIR PURIFICATION SYSTEM

(71) Applicant: AMOTECH CO., LTD., Incheon (KR)

(72) Inventors: Byung Soo Kim, Anyang-si (KR); Jin Gwan Kim, Chuncheon-si (KR); Hong Geun Lee, Jincheon-gun (KR)

(73) Assignee: AMOTECH CO., LTD., Incheon (KR)

( * ) Notice: Subject to any disclaimer, the term of this patent is extended or adjusted under 35 U.S.C. 154(b) by 151 days.

(21) Appl. No.: 16/471,972

(22) PCT Filed: Dec. 20, 2017

(86) PCT No.: PCT/KR2017/015096
§ 371 (c)(1),
(2) Date: Jun. 20, 2019

(87) PCT Pub. No.: WO2018/117629
PCT Pub. Date: Jun. 28, 2018

(65) Prior Publication Data
US 2019/0334393 A1  Oct. 31, 2019

(30) Foreign Application Priority Data
Dec. 22, 2016 (KR) .......................... 10-2016-0176585

(51) Int. Cl.
*H02K 1/14* (2006.01)
*B60H 1/00* (2006.01)
(Continued)

(52) U.S. Cl.
CPC ......... *H02K 1/146* (2013.01); *B60H 1/00521* (2013.01); *F04D 29/263* (2013.01);
(Continued)

(58) Field of Classification Search
CPC . B60H 1/00521; F04D 29/263; F04D 29/281; H02K 1/146; H02K 1/182;
(Continued)

(56) References Cited

U.S. PATENT DOCUMENTS

| 6,404,097 B1 * | 6/2002 | Pullen ................. H02K 1/2793 310/156.62 |
| 2003/0020353 A1 * | 1/2003 | Lopatinsky ......... F04D 25/0653 310/208 |

(Continued)

FOREIGN PATENT DOCUMENTS

| EP | 2012408 | 1/2009 |
| JP | 08154352 | 6/1996 |

(Continued)

OTHER PUBLICATIONS

International Search Report—PCT/KR2017/015096 dated Mar. 27, 2018.

*Primary Examiner* — Tulsidas C Patel
*Assistant Examiner* — Rashad H Johnson
(74) *Attorney, Agent, or Firm* — Cantor Colburn LLP

(57) ABSTRACT

Provided are a stack-type stator having coil patterns patterned on a multi-layer substrate, and a motor and a blower for an air purification system using the stator. A stack-type stator includes: a multi-layer substrate having first through holes; coil patterns formed on the respective substrates of the multi-layer substrate and spirally patterned to surround the first through holes and to form a plurality of turns; a stator yoke disposed at a lower portion of the multi-layer substrate and having second through holes at positions corresponding to the first through holes; and divided cores each having one side protruding above the coil patterns formed on the uppermost layer of the multi-layer substrate (Continued)

US 11,081,914 B2

Page 2 and the other side being coupled to one of the second through holes through one of the first through holes.

15 Claims, 14 Drawing Sheets

(51) Int. Cl.
    *F04D 29/26*      (2006.01)
    *F04D 29/28*      (2006.01)
    *H02K 3/26*      (2006.01)
    *H02K 5/14*      (2006.01)
    *H02K 37/08*      (2006.01)
    *H02K 1/27*      (2006.01)
    *H02K 37/12*      (2006.01)
    *H02K 21/02*      (2006.01)
    *H02K 21/24*      (2006.01)

(52) U.S. Cl.
    CPC .............. *F04D 29/281* (2013.01); *H02K 3/26* (2013.01); *H02K 5/14* (2013.01); *H02K 1/2793* (2013.01); *H02K 21/026* (2013.01); *H02K 21/24* (2013.01); *H02K 37/08* (2013.01); *H02K 37/125* (2013.01)

(58) Field of Classification Search
    CPC .......... H02K 1/2793; H02K 3/26; H02K 5/14; H02K 21/026; H02K 21/24; H02K 37/08; H02K 37/125; H02K 2203/03; H02K 2213/03
    USPC .................................. 310/179, 184, 185, 198
    See application file for complete search history.

(56) References Cited

U.S. PATENT DOCUMENTS

| | | | | |
|---|---|---|---|---|
| 2004/0135453 | A1* | 7/2004 | Naito | H02K 1/2793 310/156.32 |
| 2006/0232160 | A1* | 10/2006 | Kanno | H02K 1/148 310/216.016 |
| 2007/0104593 | A1* | 5/2007 | Yamaguchi | F04D 29/281 417/354 |
| 2010/0225195 | A1* | 9/2010 | Asano | H02K 21/24 310/216.067 |
| 2010/0314974 | A1* | 12/2010 | Horng | H02K 11/33 310/68 R |
| 2016/0241117 | A1* | 8/2016 | Cheung | H02K 1/17 |
| 2018/0175691 | A1* | 6/2018 | Koenen | H02K 3/26 |

FOREIGN PATENT DOCUMENTS

| | | |
|---|---|---|
| JP | 10248224 | 9/1998 |
| JP | 11146588 | 5/1999 |
| KR | 20090016202 | 2/2009 |
| KR | 20160090522 | 8/2016 |

* cited by examiner

STACK-TYPE STATOR USING MULTI-LAYER SUBSTRATE, SLIM MOTOR USING SAME, AND BLOWER FOR AIR PURIFICATION SYSTEM

TECHNICAL FIELD

The present invention relates to a motor, and more particularly, to a stack-type stator having coil patterns patterned on a multi-layer substrate, a slim motor using the stack-type stator, and a blower, for an air purification system, using the stack-type stator.

BACKGROUND ART

A blower for an air cleaner for a vehicle may be embedded around a rear seat in the vehicle and around a rear window inner speaker adjacent to the trunk in the vehicle.

Conventionally, it has been common to manufacture a blower for a vehicle air cleaner by using a core-type brushless direct-current (BLDC) motor.

Such a core-type BLDC motor has a structure in which a magnetic circuit is symmetrical in the radial direction about the axis thereof. Therefore, the core-type BLDC motor has little axial vibration noise, is suitable for low-speed rotation, and has the extremely small space occupied by an air gap in the direction of a magnetic path. As a result, the core-type BLDC motor can achieve high magnetic flux densities even by using low-performance magnets or even by reducing the number of magnets, and thus is advantageous in view of the large torque and the high efficiency.

However, there are disadvantages that, when manufacturing the yoke of the stator in such a core-type BLDC motor, the material loss of the yoke is large, due to the complicated structure of the yoke at the time of mass production, it is necessary to use a special expensive winding machine dedicated for winding a coil on the yoke, and the cost of equipment investment is high due to the high investment cost for molds necessary for manufacturing the stator.

Considering the problem that, since the coupling height of the device containing the core-type BLDC motor is relatively high, in the case of the core-type BLDC motor, the space restriction may be caused when the air cleaner in the vehicle is buried, there is proposed a blower for an air purifier in a vehicle in Korean Patent Application Publication No. 10-2009-0016202 (Patent Document 1) in which the installation space of the air purifier can be optimized by manufacturing the blower for an air purifier in a vehicle by using a double-rotor/single-stator type coreless type BLDC motor.

However, since the blower of Patent Document 1 has an upper rotor and a lower rotor, and adopts a stator in which a plurality of coils are individually wound on a rectangular bobbin, the thickness of the motor is thick. As a result, it is difficult to obtain a slim structure of the motor.

Furthermore, the blower of Patent Document 1 employs a coreless type stator as an axial gap type motor, and thus causes a problem that the motor efficiency is lowered.

DISCLOSURE

Technical Problem

The present invention has been made in order to solve the above-mentioned problems, and it is an object of the present invention to provide a stack-type stator using a multi-layer substrate, in which it is possible to implement a stator coil by forming a patterned coil pattern directly on each substrate on the multi-layer substrate, resulting in slimness, improved productivity, and cost reduction, a slim motor using the stack-type stator, and a blower, for a vehicle air purifier system (VAPS), using the stack-type stator.

It is another object of the present invention to provide a stack-type stator using a multi-layer substrate, in which divided cores connected to a back yoke are coupled to through holes formed in coil patterns of a multi-layer substrate, to thus minimize the occurrence of leaked magnetic flux by minimizing a portion occupied by an air gap with respect to the direction of a magnetic path to thereby increase the efficiency of a motor employing the stack-type stator, a slim motor using the stack-type stator, and a blower, for a vehicle air purifier system (VAPS), using the stack-type stator.

Technical Solution

A stack-type stator according to an embodiment of the present invention includes: a multi-layer substrate having a plurality of first through holes; a plurality of coil patterns formed on the respective substrates of the multi-layer substrate and spirally patterned to surround the plurality of first through holes and to form a plurality of turns; a stator yoke disposed at a lower portion of the multi-layer substrate and having a plurality of second through holes at positions corresponding to the plurality of first through holes; and a plurality of divided cores each having one side protruding above the plurality of coil patterns formed on the uppermost layer of the multi-layer substrate and the other side being coupled to one of the plurality of second through holes through one of the plurality of first through holes.

The divided cores each may include a shoe portion protruding over the plurality of coil patterns formed on the uppermost layer of the multi-layer substrate; and a tooth portion extending from the shoe portion and having a distal end coupled to one of the plurality of second through holes of the stator yoke through one of the plurality of first through holes of the multi-layer substrate.

In this case, the divided cores may include a stack-type structure in which a plurality of iron pieces are laminated or an integral type structure in which metal powder is compression molded.

The integral type divided cores may be formed of a crystalline metal powder, an amorphous alloy powder, or a mixed powder of a crystalline metal powder and an amorphous alloy powder.

The coil patterns corresponding to the cross-sectional shape of the tooth portion of the divided cores may be any one of a polygonal shape, a circular shape, and a fan shape in the case of an integral type structure.

The first and second through holes and the coil patterns may be each in a fan shape and the coil patterns may include a pair of radial pattern portions arranged along the radial direction when spirally patterned to form a plurality of turns.

Further, the divided cores may be formed as an integral type structure formed by compressing the metal powder, and the cross-sectional shape of the tooth portions of the divided cores may be a fan shape.

The stator yoke may serve as a base plate for supporting the stacking-type stator and a rotor.

The plurality of coil patterns may be connected by a three-phase Y-connection method or a delta connection method, and the plurality of coil patterns arranged on respective phases may be connected in parallel or in series.

When the plurality of coil patterns may be connected in series, six coil patterns may be arranged at intervals of 60° on each substrate of the multi-layer substrate, the coil patterns arranged at an identical position on each substrate may be connected in series through conductive through holes, and the coil patterns arranged in opposition to each other around a center may be connected in series through the conductive through holes.

In addition, the multi-layer substrate may be formed of first to fourth printed circuit boards (PCBs), a first wiring pattern necessary for three-phase Y-connection or delta connection may be formed on the first PCB, and second to fourth wiring patterns for connecting the coil patterns arranged in opposition to each other around the center may be formed on second to fourth PCBs.

In this case, the coil patterns disposed at an identical position in the first to fourth PCBs may be connected so that current flows in an identical direction.

Further, when the plurality of coil patterns may be connected in parallel, six coil patterns may be arranged at intervals of 60° on each substrate of the multi-layer substrate, the coil patterns arranged at an identical position on each substrate may be connected in parallel through conductive through holes, and the coil patterns arranged in opposition to each other around a center may be connected in series through the wiring patterns.

The stack-type stator according to an embodiment of the present invention may further include a motor drive circuit disposed on one side of the uppermost substrate of the multi-layer substrate and applying a driving current to the coil patterns.

A slim motor according to an embodiment of the present invention includes: a base plate; a support shaft having one end fixed to the base plate; a bushing rotatably supported on the support shaft; a rotor having a central portion of a back yoke coupled to an outer periphery of the bushing and a plurality of magnets disposed at a lower portion of the back yoke; and a stack-type stator disposed above the base plate so as to face the rotor.

The slim motor may be driven by a three-phase BLDC method.

In addition, the divided cores may be formed in a stack-type structure, the first and second through holes may be formed in a rectangular shape, and the coil patterns may be patterned in a spiral shape along the rectangular through holes.

The first and second through holes may be arranged in a radial direction in a rectangular shape and the divided cores may be formed of a plurality of iron pieces laminated along the radial direction, and the plurality of iron pieces each may include one side protruding from both ends thereof in a round shape to form a shoe portion, and the other side protruding in a rectangular shape to form a tooth portion.

Further, the first and second through holes and the coil patterns may be each formed in the shape of a fan, and the coil patterns may include a pair of radial pattern portions arranged along the radial direction and generating a tangential rotational force on the rotor in accordance with a current flow.

A slim motor according to another embodiment of the present invention includes: a base plate made of a non-magnetic material; a support shaft having one end fixed to the base plate; a bushing rotatably supported on the support shaft; a rotor having a central portion of a back yoke coupled to an outer periphery of the bushing and a plurality of magnets disposed at a lower portion of the back yoke; and a stack-type stator disposed above the base plate so as to face the rotor.

The slim motor further include a stator yoke having an annular portion having a plurality of second through holes at positions corresponding to a plurality of first through holes; and a plurality of extensions extending radially from the annular portion and having a leading end supported on the base plate.

A blower for an air purification system according to an embodiment of the present invention includes: an axial gap type motor and an impeller coupled to the axial gap type motor to suck air in a vehicle, wherein the axial gap type motor includes: a stack-type stator disposed above the base plate; and a rotor disposed in opposition to the stack-type stator with an air gap above the stack-type stator, wherein the base plate is a stator yoke.

Advantageous Effects

As described above, according to the present invention, a plurality of stator coils are implemented as a thin film type by using a plurality of conductive pattern coils formed on a multi-layer substrate, so that the plurality of stator coils are individually wound and bonded to a printed circuit board (PCB), and both ends of each of the plurality of stator coils are soldered on a printed wiring of the PCB, to thus eliminate many manual processes for wring to thereby implement a motor having a slim type stator capable of improving productivity and reducing cost, and also implement a blower used for a vehicle air purifier system (VAPS) by using the motor having a slim type stator.

In addition, in the present invention, a divided core connected to a back yoke is coupled to a through hole formed in a coil pattern on a multi-layer substrate to minimize a portion occupied by an air gap with respect to a direction of a magnetic path, thereby minimizing the generation of leakage magnetic flux, and increasing the efficiency of a motor.

Furthermore, in the present invention, a stack-type divided core is coupled to a disk-shaped back yoke through through holes formed in a coil pattern on a multi-layer substrate to form a stator core, thereby minimizing a loss of a yoke material and a cost of equipment investment at the time of mass production.

In the present invention, the disadvantages of a radial core type motor and an axial coreless type motor are eliminated and the advantages thereof are adopted, to thereby minimize the occurrence of core loss and leakage magnetic flux, have the motors slim, and reduce a manufacturing cost.

According to the present invention, since an axial type structure using a thin film type stator is employed, noise can be reduced by using a ball bearing utilizing a space in which a core type stator, which was conventionally employed in a radial type motor, is removed.

BEST MODE

Figure 1:
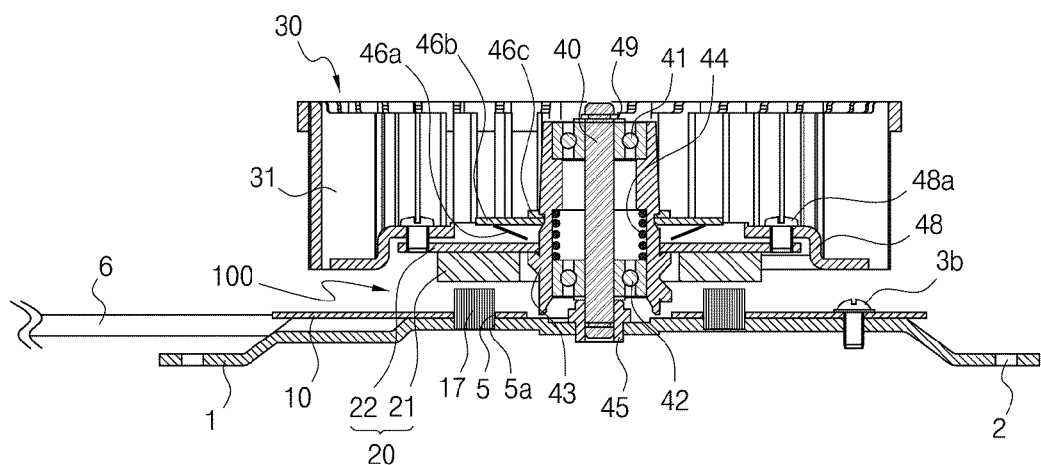
FIG. 1 is a cross-sectional view illustrating a blower for a vehicle air purifier system using an axial gap type BLDC motor according to a first embodiment of the present invention.

Hereinafter, embodiments of the present invention will be described in detail with reference to the accompanying drawings. The sizes and shapes of the components shown in the drawings may be exaggerated for clarity and convenience.

Referring to FIGS. 1 to 4, a blower for an air purification system using an axial gap type BLDC motor according to a first embodiment of the present invention includes: an axial gap type BLDC motor 100 which provides a driving force for sucking air in a vehicle and an impeller 30 which is coupled to an upper portion of the BLDC motor 100 and rotates to suck air in the vehicle, as one module of a vehicle air purifier system (VAPS) that is buried in the vicinity of a rear seat and a trunk of the vehicle, that is, near a rear window inner speaker.

The BLDC motor 100 is configured such that a stack-type stator 10 using a multi-layer substrate is fixed to an upper portion of a base plate 1 serving as a back yoke of a stator by using a fixing screw 3b, and a rotor 20 is disposed in opposition to the stack-type stator 10 above the upper portion of the stack-type stator 10 with an air gap between the stack-type stator 10 and the rotor 20.

The rotor 20 has an annular back yoke 22 made of a magnetic material and a plurality of magnets 21 having N poles and S poles alternately arranged on the bottom surface of the back yoke 22, so as to serve as a magnetic path. The BLDC motor 100 of an axial gap type structure is configured such that the plurality of magnets 21 are arranged face to face with the coil of the stator 10.

The rotor 20 may have a magnet division multi-pole arrangement structure or may have a multi-polar magnetization structure.

The BLDC motor 100 according to an embodiment of the present invention is driven by a three-phase BLDC method, in which slots and magnetic poles may be configured, for example, in a 3:4 or 3:2 ratio. In addition, in the BLDC motor 100 according to an embodiment of the present invention, the combination of slots and magnetic poles may be set at different ratios without being limited to the slot and magnetic pole ratio. The BLDC motor 100 according to the first embodiment shown in FIG. 2 has a six-slot/eight-pole structure. However, for example, the BLDC motor 100 according to the first embodiment shown in FIG. 2 may have a combination of other slots and magnetic poles such as 12 slots/10 poles, 9 slots/8 poles, and so on.

In the case of the rotor 20, the inner circumferential portion of the back yoke 22 is inserted into the outer circumferential groove of a bushing 43 and the upper portion of the back yoke 22 is provided with a wave washer 46a, a washer plate 46b and a snap ring 46c which are inserted into the outer circumferential groove of the bushing 43. Accordingly, the position of the rotor 20 is fixed to the bushing 43.

The bushing 43 is rotatably coupled to a support shaft 40 through upper and lower bearings 41 and 42 provided in upper and lower inner circumferential grooves of the bushing 43. Further, the support shaft 40 may be press-fitted into a shaft bushing 45 fixed to the base plate 1. The bushing 43 and the shaft bushing 45 are preferably made of, for example, brass.

The lower bearing 42 is inserted into the inner circumferential groove of the lower portion of the bushing 43 and is coupled with an O-ring or an E-ring. Accordingly, the position of the lower bearing 42 is fixed to the bushing 43 and the lower bearing 42 is subjected to a preload by a spring 44 inserted in the inner circumferential groove of the bushing 43. The upper bearing 41 is inserted into the inner circumferential groove on the upper portion of the bushing 43. The O-ring or the E-ring 49 is coupled to the upper portion of the support shaft 40 to fix the position of the upper bearing 41 to the bushing 43.

The back yoke 22 of the rotor 20 is rotatably supported on the support shaft 40. An impeller housing 48 is fixed to the outer side of the rotor back yoke 22 by using a fixing screw 48a or the like and is formed to surround the rotor 20. A plurality of blades 31 are installed in the outer circumference of the impeller housing 48 at intervals so that the impeller 30 is rotated while the rotor 20 is rotating to suck air in a vehicle into a vehicle air purifier system.

In this case, since the impeller housing 48 is coupled to the rotor back yoke 22, the impeller 30 is fixed along a large radius, thereby reducing vibration during rotation of the impeller 30, and extending the life of parts and thus increasing the reliability of the parts.

Figure 2:
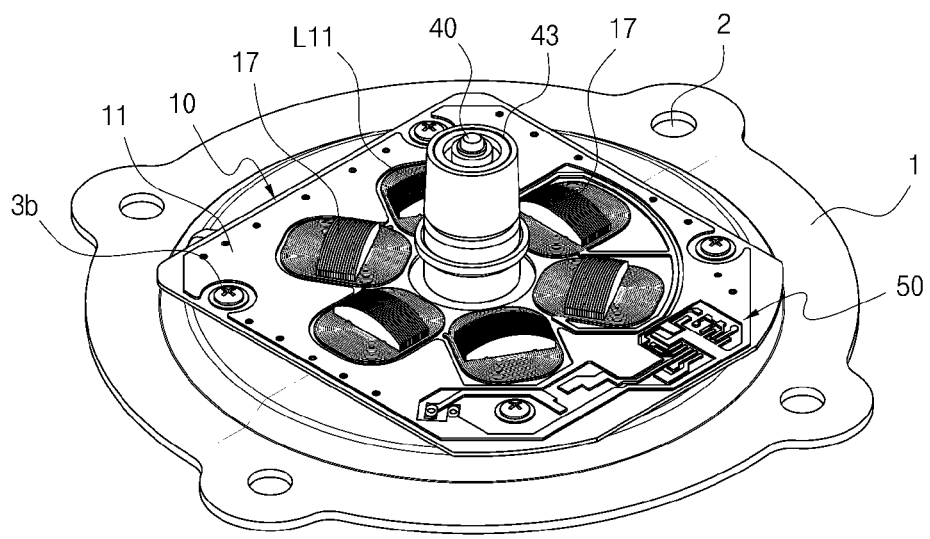
FIG. 2 is a perspective top view showing a state where an impeller and a rotor are removed from the blower shown in FIG. 1.

Hereinafter, the stack-type stator 10 using the multi-layer substrate according to an embodiment of the present invention will be described in detail with reference to FIGS. 2 to 4.

The stack-type stator 10 is fixed to the upper portion of the base plate 1 by using the fixing screw 3b or the like and the base plate 1 may be made of electrogalvanized iron (EGI) steel sheets so as to play a role of a back yoke of the stator and a support for the stator.

Figure 3:
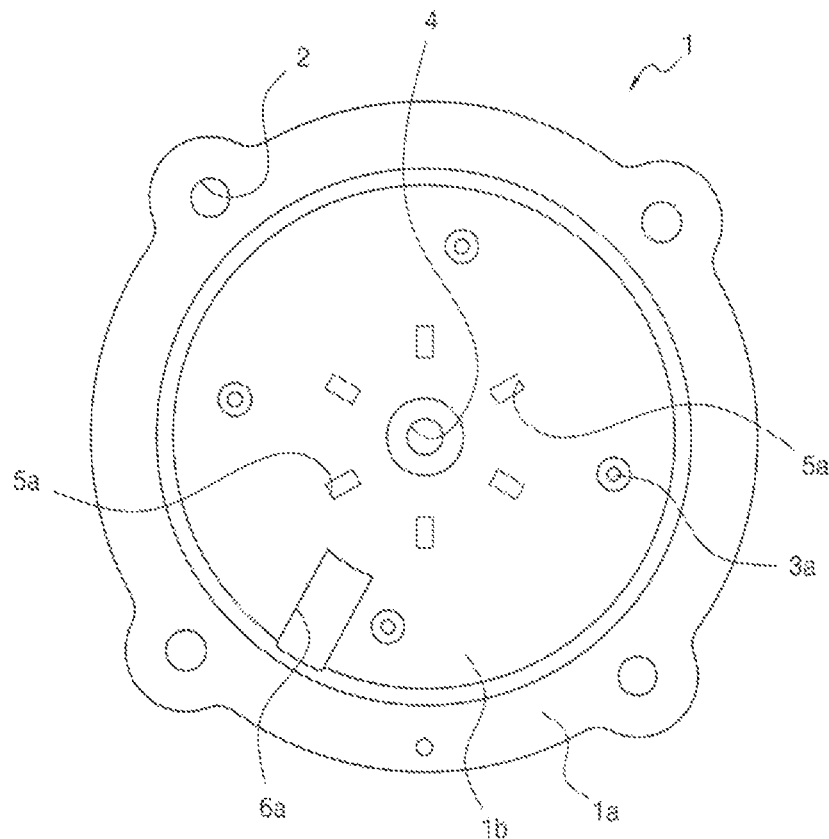
FIG. 3 is a plan view showing a base plate used as a back yoke in a stator.

The base plate 1 may be provided with a stack-type stator 10 on an upper side protruded to have a step between the inner side portion 1b and the outer side portion 1a as shown in FIG. 3. However, the stack-type stator 10 may be installed on a recessed bottom of the base plate 1, that is, the inner side portion 1b. The bending of the base plate 1 so as to have a step between the inner side portion 1b and the outer side portion 1a is intended to prevent the base plate 1 from being warped or distorted so as to suppress noise caused by vibration of the blower.

As shown in FIG. 3, the base plate 1 includes a plurality of through holes 2 used for fixing the blower to the vehicle air purifier system (VAPS), in the outer side portion 1a, and a through hole 4 into which the shaft bushing 45 is press-fitted, at the center of the inner side portion 1b.

In addition, a plurality of through holes 3a used for fixing the stack-type stator 10 using the fixing screws 3b or the like are disposed on the outer side of the inner side portion 1b of the base plate 1. As shown in FIG. 2, a plurality of core fixing through holes 5a to which a plurality of divided cores 17 are coupled are formed between the plurality of through holes 3a and the through hole 4.

As will be described later, the stack-type stator 10 includes a multi-layer substrate formed by patterning a plurality of coil patterns L11 to L16, L21 to L26, and L31 to L36 in a spiral conductive pattern on each substrate. A plurality of through holes 5 corresponding to the plurality of core fixing through holes 5a are formed in the plurality of coil patterns. The plurality of core fixing through holes 5a and the plurality of through holes 5 corresponding thereto are both formed in a rectangular shape. In FIG. 3, reference numeral 6a denotes a through hole through which a wire harness 6 passes in which the wire harness 6 is necessary for supplying a control signal and power to the blower from the VAPS.

Figure 4:
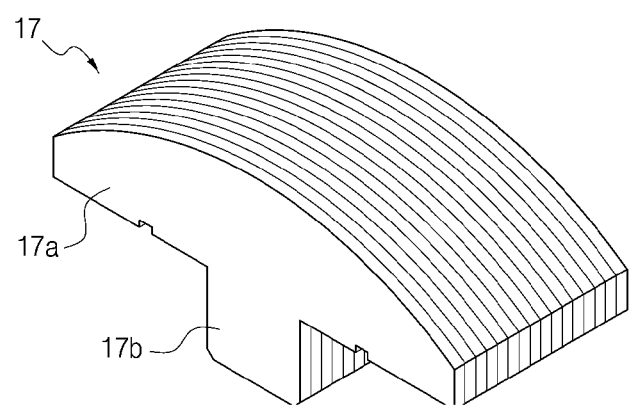
FIG. 4 is a perspective view illustrating a divided core coupled to the base plate of FIG. 3 to constitute a stator core.

As shown in FIG. 4, each of the plurality of divided cores 17 includes a shoe portion 17a having a round shape at one side thereof and a tooth portion 17b protruding in a rectangular shape while projecting from the shoe portion 17a and corresponding to the through holes 5 and 5a.

The tooth portion 17b passes through the through hole 5 of the stack-type stator 10 and is preferably formed in a length corresponding to the thickness of the stack-type stator 10 and the base plate 1 so as to be engaged with the core fixing through hole 5a of the base plate 1.

Each of the plurality of divided cores 17 may be formed by laminating a plurality of thin plates such as, for example, an electromagnetic steel plate so as to serve as a magnetic path. Therefore, it is preferable that the through holes 5 and the core fixing through holes 5a of the stack-type stator 10 to which the tooth portions 17b of the divided cores 17 are coupled also have a rectangular shape.

The core fixing through holes 5a and the plurality of through holes 5 corresponding thereto are all arranged along the radial direction. Each of the divided cores 17 is formed of a plurality of iron pieces laminated along the radial direction. The plurality of iron pieces each includes one side protruding from both ends thereof in a round shape to form a shoe portion 17a, and the other side protruding in a rectangular shape to form a tooth portion 17b.

The plurality of divided cores 17 are fixed to the base plate 1 by, for example, press fitting, bonding, riveting or the like, so that the stack-type stator 10 according to an embodiment of the present invention changes from a coreless type to a core type.

As a result, it is possible to minimize the leakage magnetic flux deviating from the magnetic paths in the magnetic circuit formed between the coils of the stator and the magnets of the rotor, thereby improving the motor efficiency.

The stack-type stator 10 according to an embodiment of the present invention may be mounted with a motor drive circuit 50 connected to the coil patterns L11 to L16, L21 to L26, and L31 to L36 on one side of the upper surface of the multi-layer and applying a driving current to a driving motor.

Meanwhile, according to the first embodiment shown in FIG. 1, the BLDC motor 100 is configured such that the stack-type stator 10 is fixed to the upper portion of the base plate 1 serving as a back yoke of the stator, by using a fixing screw 3b or the like, and a plurality of divided cores 17 are coupled to the core fixing through holes 5a of the base plate 1 via the through holes 5 of the stack-type stator 10 to constitute a core type stator.

Figure 5:
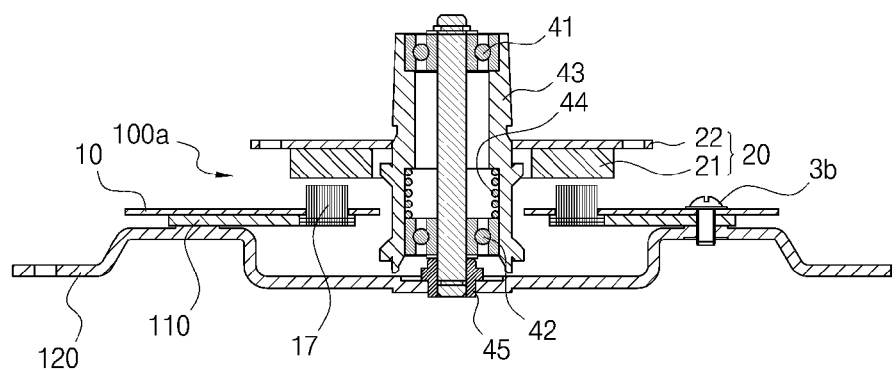
FIG. 5 is a cross-sectional view illustrating a state where an impeller and a rotor are removed from a blower for a vehicle air purifier system using an axial gap type BLDC motor according to a second embodiment of the present invention.

However, the BLDC motor 100a according to the second embodiment of the present invention may be configured such that a base plate 120 may be made of a material such as plastic or aluminum so as not to play a role of a back yoke, as in the second embodiment shown in FIG. 5.

The stack-type stator 10 and the rotor 20 which are applied to the BLDC motor 100a according to the second embodiment are the same as those of the first embodiment, and therefore, the same reference numerals are assigned thereto and the detailed description thereof is omitted.

Figure 6:
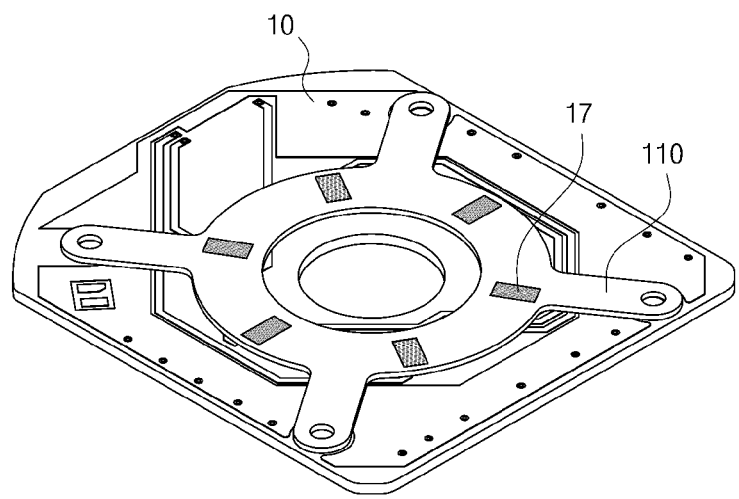
FIG. 6 is a perspective rear view of a structure in which a multi-layer substrate and divided cores are coupled to a stator yoke.
Figure 7:
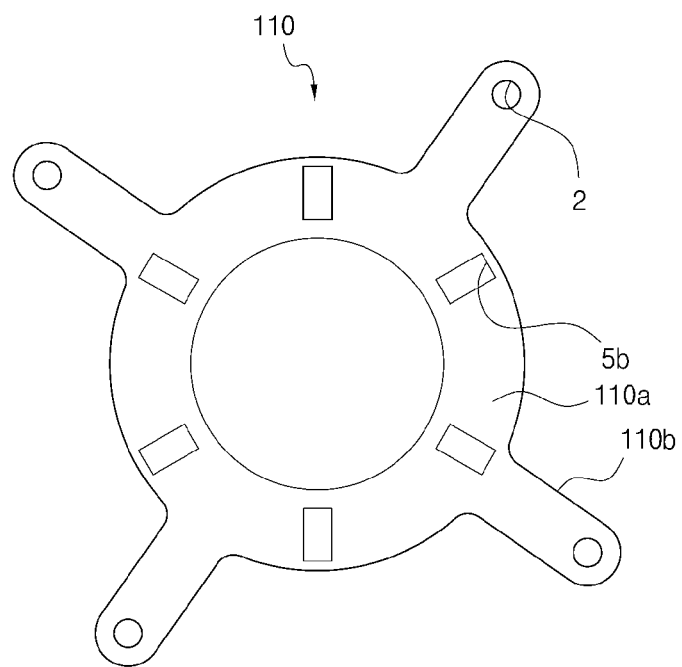
FIG. 7 is a plan view showing a stator yoke applied to a second embodiment of the present invention.

Referring to FIGS. 5 to 7, the axial gap type BLDC motor according to the second embodiment of the present invention includes a stator yoke 110 inserted between the base plate 120 made of a nonmagnetic material and the stack-type stator 10.

The stator yoke 110 may be formed by laminating a thin plate such as an electromagnetic steel plate so as to play a role of a yoke.

As shown in FIG. 7, the stator yoke 110 includes an annular portion 110a having a bandwidth corresponding to the six through holes 5 of the coil patterns L11 to L16, L21 to L26, and L31 to L36 in the stack-type stator 10, and four extending portions 110b extending in the radial direction from the annular portion 110a.

The six through holes 5b corresponding to the through holes 5 of the coil patterns L11 to L16 and L21 to L26 and L31 to L36 are formed at intervals of 60 degrees in the annular portion 110a, so that the plurality of divided cores 17 can be combined in the annular portion 110a.

In addition, the four extending portions 110b include through holes 2 used for fixing the stack-type stator 10 to the stator yoke 110, respectively.

When the base plate 120 is made by a die casting method of an injection molded product obtained by injection molding a plastic material or an aluminum material as in the case of the axial gap type BLDC motor 100a according to the second embodiment, the stator yoke 110 capable of serving as a yoke is disposed below the stack-type stator 10 and then the plurality of divided cores 17 are press-fitted into the through holes 5b of the stator yoke 110 via the through holes 5 of the coil patterns L11 to L16, L21 to L26, and L31 to L36.

As a result, the BLDC motor 100a according to the second embodiment can minimize leakage magnetic flux deviating from the magnetic circuit formed between the coils of the stator and the magnets of the rotor, by easily forming a core type stator, thereby increasing the motor efficiency.

When the base plate 120 supports the assembly of the stator yoke 110 and the stack-type stator 10, the fixing screw 3b is fastened between the assembly of the stator yoke 110 and the stack-type stator 10 and the base plate 120. The base plate 120 has a structure in which and the fixed portion is annularly bulged and the inner side thereof is recessed, or the assembly may be installed on the upper side of the base plate 1 bent and protruded to have a step between the inner side portion 1b and the outer side portion 1a like the base plate 1 of the first embodiment shown in FIG. 2, or the assembly may be installed on the recessed bottom of the base plate 1 as shown in FIG. 3.

In the stack-type stator 10 according to the embodiment of the present invention, a plurality of coil patterns are formed on each substrate of a multi-layer substrate, and the plurality of coil patterns may be connected in parallel or in series.

When the plurality of coil patterns are connected in parallel, the resistance value of the coil patterns becomes smaller, and thus the current value and power consumption increase. As a result, in the case of a motor requiring a high drive RPM and drive torque, a plurality of coil patterns are connected in parallel.

Reversely, when a plurality of coil patterns are connected in series, the resistance value of the coil patterns increases and thus the current value and the power consumption are reduced. As a result, the driving RPM and driving torque of the motor are reduced, to accordingly form a motor suitable for low RPM with low power consumption. Therefore, it is possible to select a connection method of a plurality of coil patterns depending on the use of the motor to be used.

Figure 8:
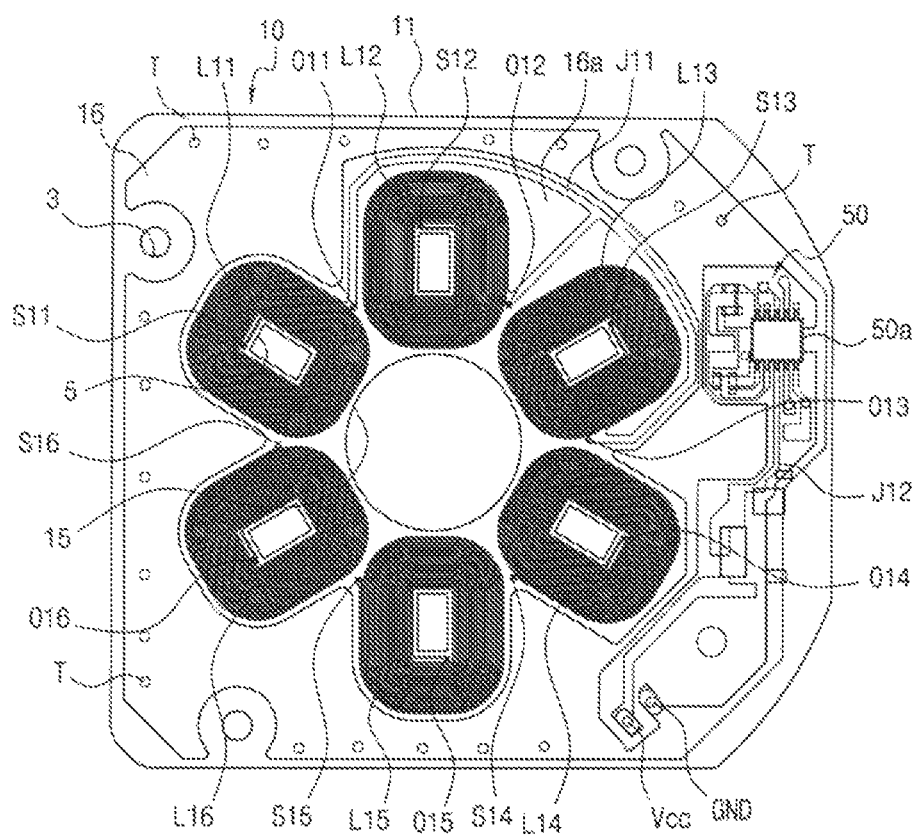
FIG. 8 is a plan view showing a stack-type stator having stator coils in a parallel connection structure in the stack-type stator according to the first embodiment of the present invention.
Figure 9A:
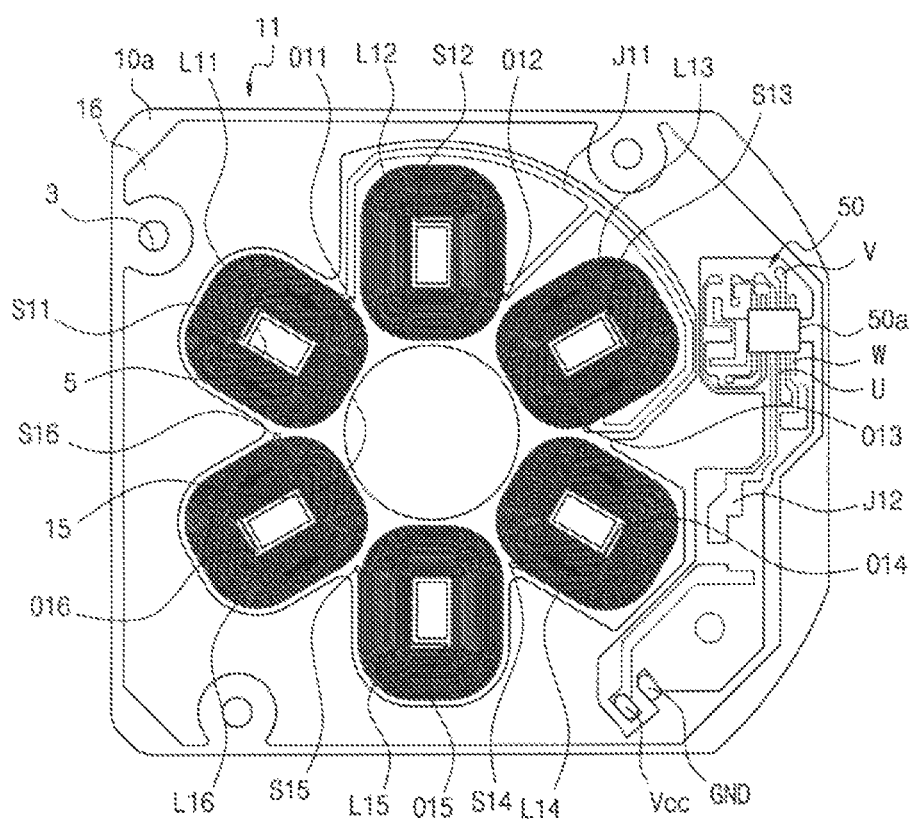
FIGS. 9A to 9D are plan views showing coil patterns of respective layers in the stack-type stator shown in FIG. 8.
Figure 9B:
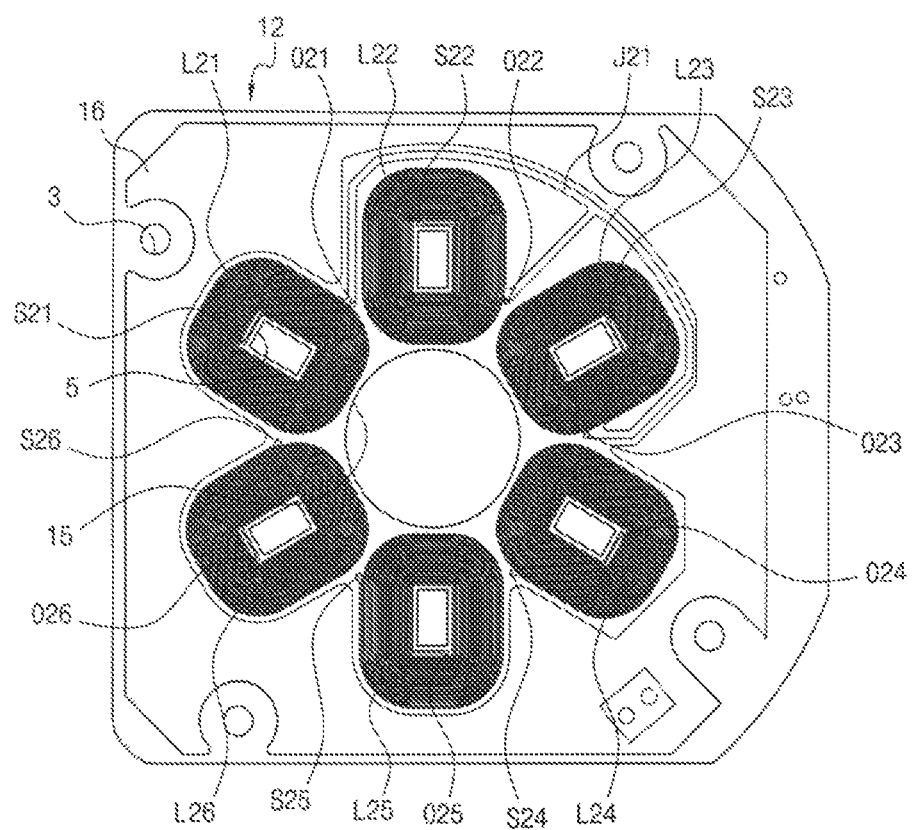
Figure 9C:
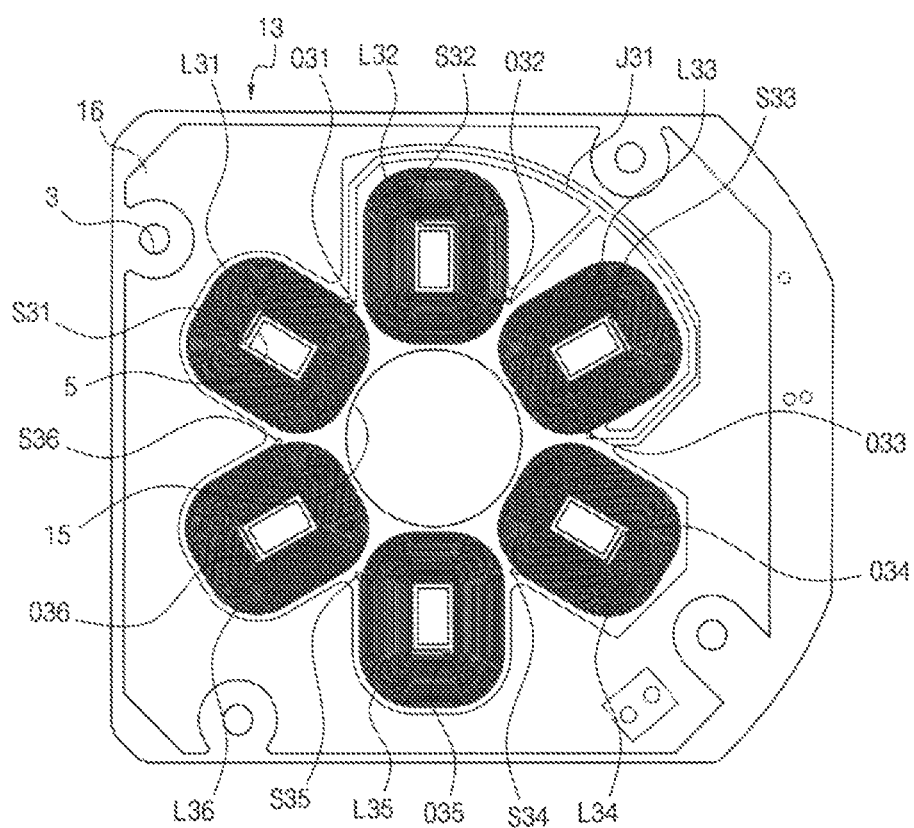
Figure 9D:
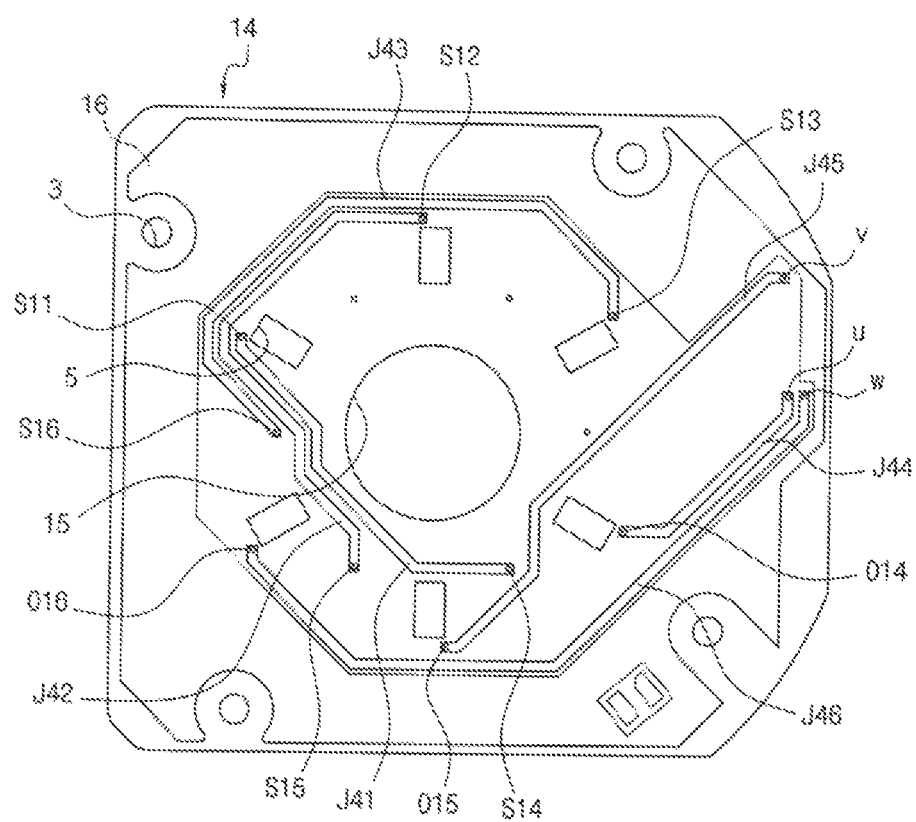
Figure 10:
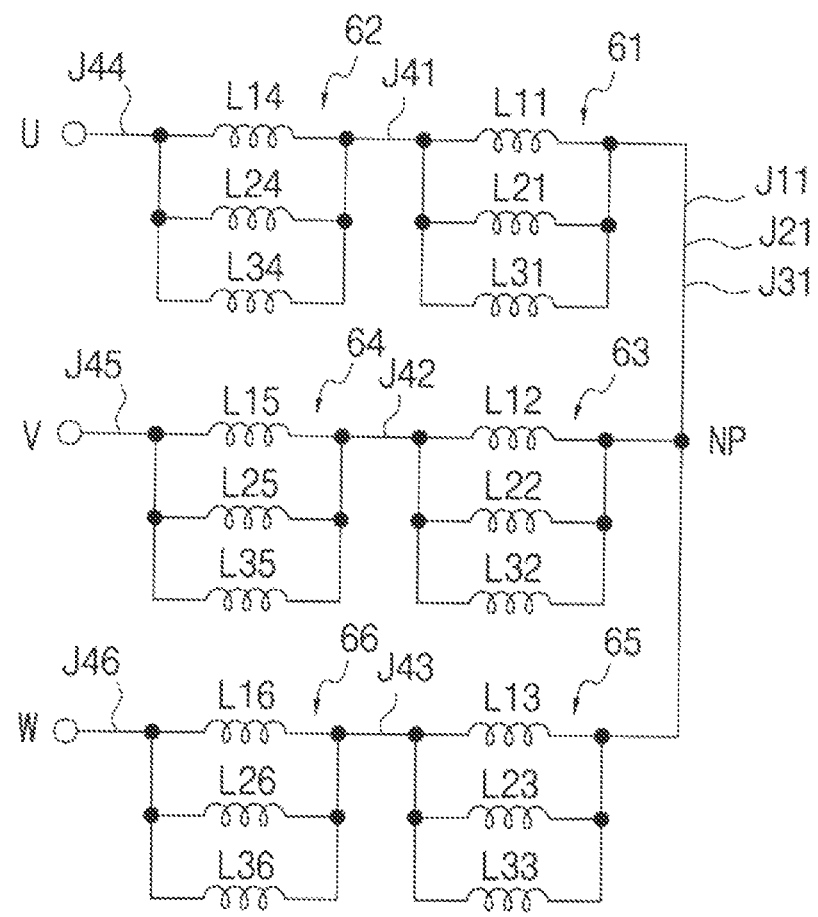
FIG. 10 is an equivalent circuit diagram of stator coils in the stack-type stator shown in FIGS. 9A to 9D.

FIG. 8 shows a stack-type stator according to an embodiment of the present invention in which the stator coils have a parallel connection structure, FIGS. 9A to 9D are plan views of respective four-layer PCBs forming the stack-type stator according to the embodiment of the present invention shown in FIG. 8, and FIG. 10 shows an equivalent circuit diagram of the stator coils in the stack-type stator according to the embodiment of the present invention shown in FIG. 8.

When the BLDC motor 100 is driven in a three-phase BLDC scheme and has, for example, a six-slot/eight-pole structure, the stack-type stator 10 according to an embodiment of the present invention may be configured as a multi-layer substrate in which eighteen coil patterns L11 to L16, L21 to L26, and L31 to L36 have a parallel connection structure and PCBs are stacked in four layers.

The stack-type stator 10 is configured such that eighteen coil patterns L11 to L16, L21 to L26 and L31 to L36 are disposed six by six for first to third PCBs 11 to 13 of a three-layer structure as shown in FIGS. 9A to 9C, respectively, and the stack-type stator 10 is configured such that eighteen coil patterns L11 to L16, L21 to L26 and L31 to L36 are connected in a Y-connection method by using wiring patterns J11, J21, and J31 formed on the lowermost wiring fourth PCB 14 shown in FIGS. 9D and 10.

That is, one end of the respective three-phase (U, V, W) coil patterns L11, L21, L31; L12, L22, L32; and L13, L23, L33 is commonly connected on the first to third PCBs 11 to 13 so as to form a neutral point (NP), and the wiring patterns J11, J21 and J31 are connected to the coil patterns L11, L21, L31; L12, L22, L32; and L13, L23, L33 to then be connected in a Y-connection method.

To this end, the three leading ends extending from the wiring patterns J11, J21 and J31 are connected to the end portions O11, O21, O31; O12, O22, O32; and O13, O23, O33 of the coil patterns L11, L21, L31; L12, L22, L32; and L13, L23, L33, and the start portions S11, S21, S31; S12, S22, S32; and S13, S23, S33 are disposed in the inner side of the coil patterns L11, L21, L31; L12, L22, L32; and L13, L23, L33.

Since the BLDC motor 100 is driven by a three-phase BLDC method in which a plurality of coils are formed by a three-phase Y-connection method and is driven in a six-step manner, the direction in which the driving current flows is periodically changed. Therefore, in the coil patterns according to the embodiment of the present invention, the start portions and the end portions play a big role of the purpose for designating the position of the through holes as portions in which the through holes required for parallel connection are disposed.

Also, the BLDC motor 100 according to the embodiment of the present invention may be driven by a three-phase BLDC method and a plurality of coils may be delta-connected instead of a three-phase Y-connection.

The stack-type stator 10 according to the present invention including stator coils having a parallel connection structure has six coil patterns L11 to L16, L21 to L26 and L31 to L36 disposed for each phase (U, V, W), as shown in FIG. 10, and the three coil patterns arranged at the same position over the three layers constitute one parallel circuit, respectively, and the first and second parallel circuits 61 to 66 connected in parallel for each phase (U, V, W) has a serial connection structure.

The coil patterns are arranged at intervals of 60 degrees around the through hole 15, and the coil patterns L11 to L16, L21 to L26, and L31 to L36 are alternately arranged into coil patterns of U, V, and W phases for each layer. For example, coil patterns L11 to L13 for U, V and W phases are arranged from the left side to the right side of the upper side of the first PCB 11, and coil patterns L14 to L16 for U, V and W phases are arranged from the right side to the left side of the lower side of the first PCB 11, in which the coil patterns for U, V and W phases face each other around the through hole 15.

The start portions S11,S21,S31; S12,S22,S32; and S13, S23,S33 and the end portions O11,O21,O31;O12,O22,O32; and O13,O23,O33 of the three coil patterns L11,L21,L31; L12,L22,L32; and L13,L23,L33 arranged at the same position are respectively connected to each other via the conductive through holes to form the first parallel circuits 61, 63 and 65, and the start portions S14,S24,S34; S15,S25,S35; and S16,S26,S36 and the end portions O14,O24,O34;O15, O25,O35; and O16,O26,O36 of the three coil patterns L14, L24,L34; L15,L25,L35; and L16,L26,L36 arranged at the same position are respectively connected to each other via the through holes to form the second parallel circuits 62,64, and 66. The first parallel circuits 61, 63, and 65 and the second parallel circuits 62, 64, and 66 are connected in series via the wiring patterns J41 to J43.

In addition, in the fourth PCB 14 shown in FIG. 9D, the end portions O14, O24, O34; O15, O25, O35; and O16, O26, O36 of the coil patterns L14, L24, L34; L15, L25, L35; and L16, L26, L36, that is, the second parallel circuits 62, 64, and 66 are connected to the U-phase output terminal U, the V-phase output terminal U, and the W-phase output terminal W, of the motor drive circuit 50 via the wiring patterns J44 to J46, respectively.

Referring to FIGS. 9A to 9D, the stack-type stator 10 according to the embodiment of the present invention includes: first to fourth PCBs 11 to 14 made up of an insulating material in which four layers are stacked and integrated; a plurality of coil patterns L11 to L16, L21 to L26, and L31 to L36 formed of spiral conductive patterns obtained by patterning a copper foil laminated on each layer PCB so as to form a plurality of turns necessary for constructing stator coils; and a plurality of conductive through holes formed by plating the through holes formed by penetrating through the first to fourth PCBs 11 to 14, and formed in the start portions S11 to S16, S21 to S26, and S31 to S36 and the end portions O11 to O16, O21 to O26, and O31 to O36 of each coil pattern in order to interconnect the plurality of coil patterns L11 to L16, L21 to L26, and L31 to L36.

The stack-type stator 10, that is, the first to fourth PCBs 11 to 14 have a substantially rectangular shape, and a through hole 15 having a diameter larger than the outer diameter of the bushing 43 is formed at the center of the stack-type stator 10.

A motor drive circuit 50 is integrally formed on one side of the first PCB 11 by patterning a copper foil. When a DC drive power source is applied between the power supply terminals Vcc and GND, a motor drive chip 50a and various components are integrally mounted in the motor drive circuit 50, and a plurality of wiring patterns J12 are formed for circuit connection therein, such that drive currents applied to three-phase (U, V, W) coil patterns L11 to L16, L21 to L26, and L31 to L36 are controlled by a pulse width modulation (PWM) method. The motor drive chip 50a may include a soft start function, a minimum speed hold function, and the like in addition to the PWM method current control function.

The first to fourth PCBs 11 to 14 are provided with a ground pattern 16 formed of a copper foil on either outer side of the tetragonal PCBs so as to surround the inside of the tetragonal PCBs and a coil pattern forming region 16a is arranged in the inside of the ground pattern 16.

The coil patterns L11 to L16, L21 to L26 and L31 to L36 are arranged in the coil pattern formation region 16a at intervals of 60 degrees around the through hole 15.

The ground pattern 16 is formed so as to surround the coil patterns to prevent magnetic fluxes generated in the coil patterns L11 to L16, L21 to L26, and L31 to L36 from being dispersed, and a plurality of through holes T are disposed along the outer periphery of the ground pattern 16 to prevent occurrence of the potential difference between regions and to integrate the multi-layer substrate.

The rectangular through holes 5 into which the tooth portions 17b of the divided cores 17 are coupled are formed at the centers of the coil patterns L11 to L16, L21 to L26, and L31 to L36, in the stack-type stator 10, that is, the first to fourth PCBs 11 to 14, and each of the coil patterns L11 to L16, L21 to L26 and L31 to L36 forms a spiral wound pattern along the through hole 5 to realize a plurality of turns.

The coil patterns L11 to L16, L21 to L26, L31 to L36 each have four sides, and a pair of long side pattern portions located on both sides along the long side of the rectangular through hole 5 are arranged parallel to each other, but it is also possible to arrange the pair of long side pattern portions along the radial direction from the center of the rectangular through hole 5.

As shown in FIG. 4, when each of the divided cores 17 has a structure in which a leading end of the each divided core 17 is formed by laminating a plurality of pieces of iron pieces, each having a shoe portion and a tooth portion of a round shape, the tooth portions 17b of the divided cores 17 have a rectangular cross section. Accordingly, the through holes 5 also have a rectangular shape, and the coil patterns L11 to L16, L21 to L26, and L31 to L36 have a shape that surrounds the through holes 5 having a rectangular shape.

In this case, it is difficult to freely design the shape of the divided cores in which the iron pieces are laminated, but it is also possible to apply integral cores instead of the stack-type divided cores. That is, the integral cores may be integrally formed by compression-molding, for example, a mixture of an amorphous alloy powder and a spherical crystalline metal powder excellent in soft magnetic properties, an amorphous alloy powder or a spherical crystalline metal powder excellent in soft magnetic properties, together with a binder, so that the shapes of the shoe portions and the tooth portions can be freely designed.

Since the spherical crystalline metal powder having excellent soft magnetic properties is contained in the plate-like amorphous alloy powder, the magnetic permeability can be improved, the difficulty of high-pressure sintering at the time of compression-molding can be solved, filling density can be improved, and magnetic permeability can be increased.

Accordingly, the shoe portions of the divided cores may have, for example, a hemispherical shape, and the tooth portions thereof may have a rectangular shape, a square shape, a circular shape, a triangular shape, a fan shape, or the like.

When the cross-sections of the tooth portions in the divided cores have a fan shape, the through holes 5a and 5b of the multi-layer substrate 10a, the base plate 1 or the stator back yoke 110 may also formed into a fan shape and the coil patterns L11 to L16, L21 to L26, and L31 to L36 may be designed as a fan shape.

When the coil patterns L11 to L16, L21 to L26, and L31 to L36 are formed into a fan shape, each coil pattern may include inner and outer rotation direction pattern portions arranged along the circumferential direction at intervals in the inner and outer circumferences, and radial pattern portions interconnecting the inner and outer rotation direction pattern portions and arranged in the radial direction from the center of the coil pattern.

Thus, when the shape of the coil pattern is formed into a fan shape having radial direction pattern portions on both sides, and when a current is applied to the coil pattern, the radial direction pattern portions are oriented in the radial direction (i.e., normal direction) perpendicular to the rotational direction (circumferential direction) of the rotor 20, and tangential forces F are generated from the radial direction pattern portions in accordance with Fleming's left-hand rule. As a result, the stack-type stator 10 generates rotational torque that effectively rotates the rotor when a fan-shaped coil patterns are applied thereto.

The stack-type stator 10 may be configured by stacking first to fourth PCBs 11 to 14, wherein each PCB may be formed using a multi-layer substrate 10a made of a copper clad laminate (CCL) formed by laminating a copper foil. In order to form the stack-type stator 10, a copper foil of each layer substrate is patterned and laminated, and then a conductive through hole is formed.

In the following description, a multi-layer substrate will be described with respect to an example in which a coil pattern is formed by patterning a copper clad laminate (CCL). However, it is also possible to print and form a coil pattern on a general substrate using a silver-paste or a copper-paste without using a copper clad laminate. Even this case should also be regarded as falling within the scope of the present invention.

The substrate 10a may be made of an insulating resin such as FR-4 or CEM-3 made of a glass epoxy laminate, for example, as a material for the substrate. The multi-layer substrate 10a has a structure in which a copper foil is laminated on a substrate of each layer. Any insulating resin may be used as a substrate material if a multi-layer PCB can be formed. The number of layers of the substrates to be stacked may be set within a range of 1 to 10 layers in proportion to a desired RPM of a single phase motor. In order to obtain a high RPM, it is required to increase the number of PCBs stacked so as to use a plurality of coil patterns since a large number of coil turns is required so as to obtain a high torque value.

In the case of using the multi-layer substrate 10a in which the multi-layer PCB is laminated, wiring patterns J41 to J46 for connecting the coil pattern and the motor drive circuit 50 to each other are formed on the lowermost PCB, and various electronic components are mounted on the wiring pattern J12 on the uppermost PCB, and the driving power source is connected between the power supply terminals Vcc and GND of the wiring pattern J12.

In the following description of the embodiment, it is assumed that the multi-layer substrate 10a includes a multi-layer PCB in which first to fourth PCBs 11 to 14 having a four-layer structure are stacked.

The coil patterns L11 to L16, L21 to L26 and L31 to L36 are formed on the upper surfaces of each substrate 10*a* in the first to third PCBs 11 to 13 and a wiring pattern is formed in the lowermost fourth PCB 14, by finely patterning a conductive metal such as a copper foil (Cu), for example. Each of the PCBs 11 to 14 may be selected from among those having various thicknesses of, for example, 0.4 mm and 0.8 mm. The coil patterns L11 to L16, L21 to L26, and L31 to L36 applied to the embodiment of the present invention, for example, are patterned with a pattern width of 0.12 mm and an interval between adjacent patterns of 0.13 mm. The width of the coil patterns and the distance between the patterns may be increased or decreased as needed.

When the rotor 20 is combined with the stack-type stator 10 in which the coil patterns L11 to L16, L21 to L26 and L31 to L36 are connected in parallel to form a BLDC motor 100 of an axial gap type, the BLDC motor 100 is driven by a three-phase BLDC method.

When the BLDC motor 100 has, for example, a six slot/eight pole structure and the BLDC motor 100 is controlled to be driven in a six-step manner, and when the rotor position is 0°, the motor drive circuit 50 is controlled to perform a current flow control so that the current returns to the W-phase output terminal W via the W-phase coil patterns L13, L23 and L33, the wiring pattern J43, the coil patterns L16, L26 and L36 and the wiring pattern J46, after passing through the wiring pattern J44, the U-phase coil patterns L14, L24 and L34, the wiring pattern J41, the coil patterns L11, L21 and L31, and the wiring patterns J11, J21, and J31 from the U-phase output terminal U.

That is, a drive current is applied to the three coil patterns L14, L24 and L34 of the second parallel circuit 62 from the U-phase output terminal U of the three-phase (U, V, W) output terminals of the motor drive circuit 50 through the wiring pattern J44, the current flows from the end portions O14, O24 and O34 of the coil patterns L14, L24 and L34 to the start portions S14, S24 and S34, respectively, and then the current flows from the start portions S11, S21 and S31 of the coil patterns L11, L21 and L31 of the first parallel circuit 61 to the end portions O11, O21 and O31 through the wiring pattern J41. Then, the current flows to the W-phase output terminal W of the motor drive circuit 50 via the wiring pattern J11, the W-phase coil patterns L13, L23 and L33, the wiring pattern J43, the coil patterns L16, L26 and L36 and the wiring pattern J46.

Generally, since the outer and inner rotation direction pattern portions of the coil patterns are arranged in a substantially concentric circle shape, the direction of the force F generated in accordance with the Fleming's left-hand rule is directed radially. Accordingly, the outer and inner rotation direction pattern portions of the coil patterns which are arranged in a substantially concentric circle shape does not greatly affect the torque generation, but merely act as a path through which the current flows. In addition, a force is generated in the tangential direction from the long-side pattern portion (or the radial direction pattern portion), to achieve the rotation of the rotor 20.

When the current flows as described above, for example, the long-side pattern portion (or the radial direction pattern portion) that are located on both sides along the long side of the rectangular through hole 5 in the three coil patterns L14, L24, and L34 and the three coil patterns L11, L21, and L31 located at the same position has the position opposite to the magnet of the rotor at the same time, and the flow direction of the current is set to be the same, to generate a combined torque. The long-side pattern portion (or the radial direction pattern portion) are oriented in the radial direction (i.e., normal direction) perpendicular to the rotational direction (circumferential direction) of the rotor 20, and tangential forces F are generated from the radial direction pattern portions in accordance with Fleming's left-hand rule.

The current flow direction is set identically in the three coil patterns L13, L23 and L33 and the three coil patterns L16, L26 and L36 arranged at the same position, to thus generate a combined torque. The long-side pattern portion (or the radial direction pattern portion) are oriented in the radial direction (i.e., normal direction) perpendicular to the rotational direction (circumferential direction) of the rotor 20, and tangential forces F are generated from the radial direction pattern portions in accordance with Fleming's left-hand rule.

As a result, the rotor 20 disposed in opposition to the stack-type stator 10 is rotated.

Thereafter, when the rotor rotates by 60 degrees and the rotor position is detected by a Hall sensor, the motor drive circuit 50 switches the output terminal. By setting the current flow path so that the drive current flows through the W-phase coil patterns L13, L23 and L33; L16, L26 and L36 from the V-phase coil patterns L15, L25 and L35; L12, L22, and L32, the rotation of the rotor continues.

The coil patterns L11 to L16, L21 to L26, and L31 to L36 each have a spiral shape, are directed from the inside to the outside or from the outside to the inside depending on the connection method of the coil patterns using the through holes, and may be configured by combining patterns oriented in the clockwise direction (CW) or the counterclockwise direction (CCW).

In some embodiments of the present invention, a plurality of through holes may be formed at the start portion and the end portion of the coil patterns for wiring the coil patterns at the same positions of the first to fourth PCBs 11 to 14, and soldering lands may be formed of the conductive patterns. The start portions and the end portions of the coil patterns are formed to be wider than the portion forming the coil (winding), for example, in the form of a tear drop, and the through holes and the soldering lands surrounding the through holes are arranged in the start portions and the end portions of the coil patterns.

As a result, in some embodiments of the present invention, the thickness of the coil pattern of each layer in the stack-type stator is adjusted so that the start portion and the end portion can be designed to be wider than the portion forming the coil (winding), thereby increasing the reliability of connection.

That is, the start portions and the end portions of the coil patterns are formed in the form of a tear drop, and the through holes and the soldering lands surrounding the through holes are disposed in the start portions and the end portions of the coil patterns. Thus, it is easy to interconnect the coil patterns, or connect the coil patterns with the wire patters and it is possible to guarantee the reliability of the connection.

In order to increase the reliability, at least two through holes connecting the start portion and the end portion to each layer may be formed to prevent lowering of reliability due to breakage of the wire or deterioration of the through hole.

Hereinafter, a stack-type stator according to a second embodiment of the present invention will be described with reference to FIGS. 11A to 11D and FIG. 12.

Figure 11A:
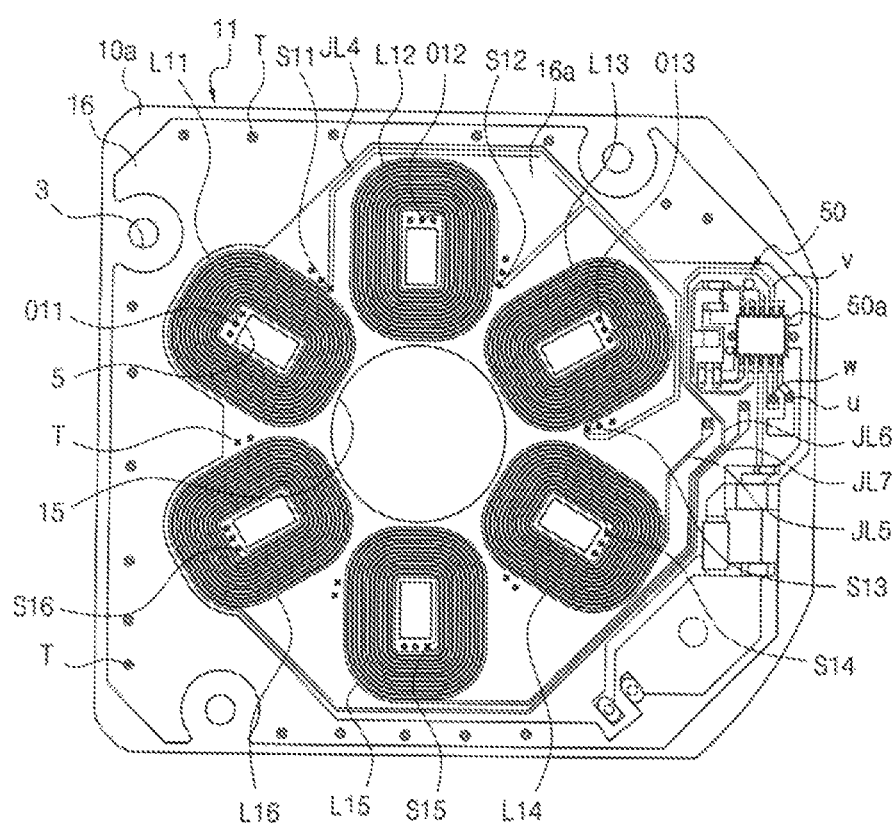
FIGS. 11A to 11D are plan views showing a stack-type stator having stator coils in a series connection structure in the stack-type stator according to the second embodiment of the present invention.
Figure 11B:
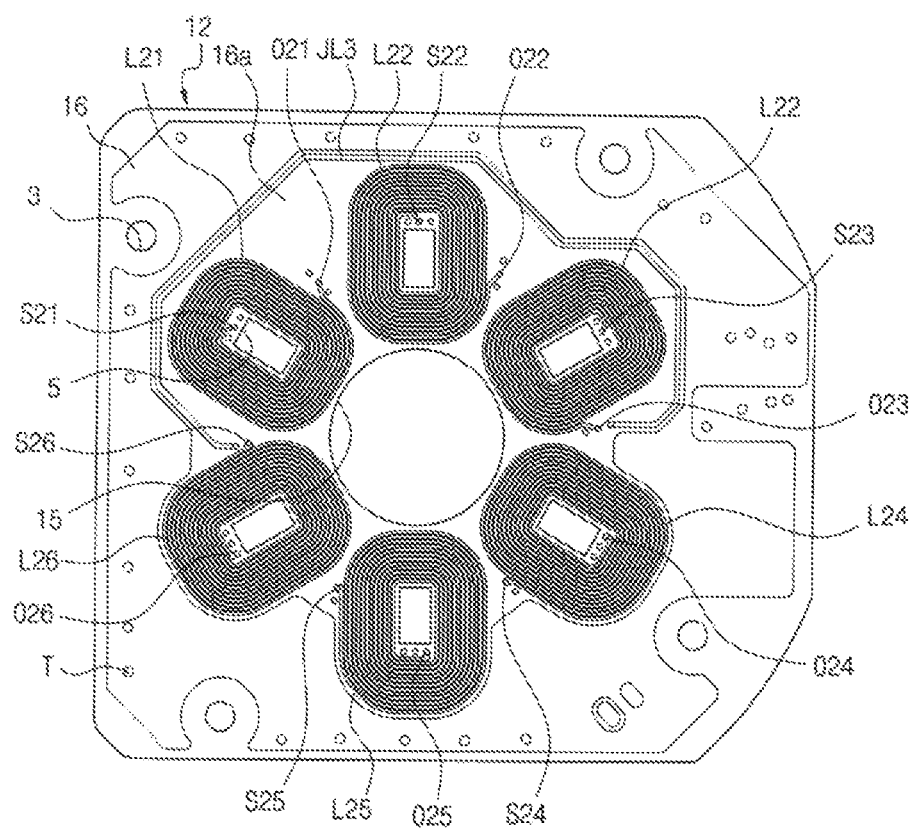
Figure 11C:
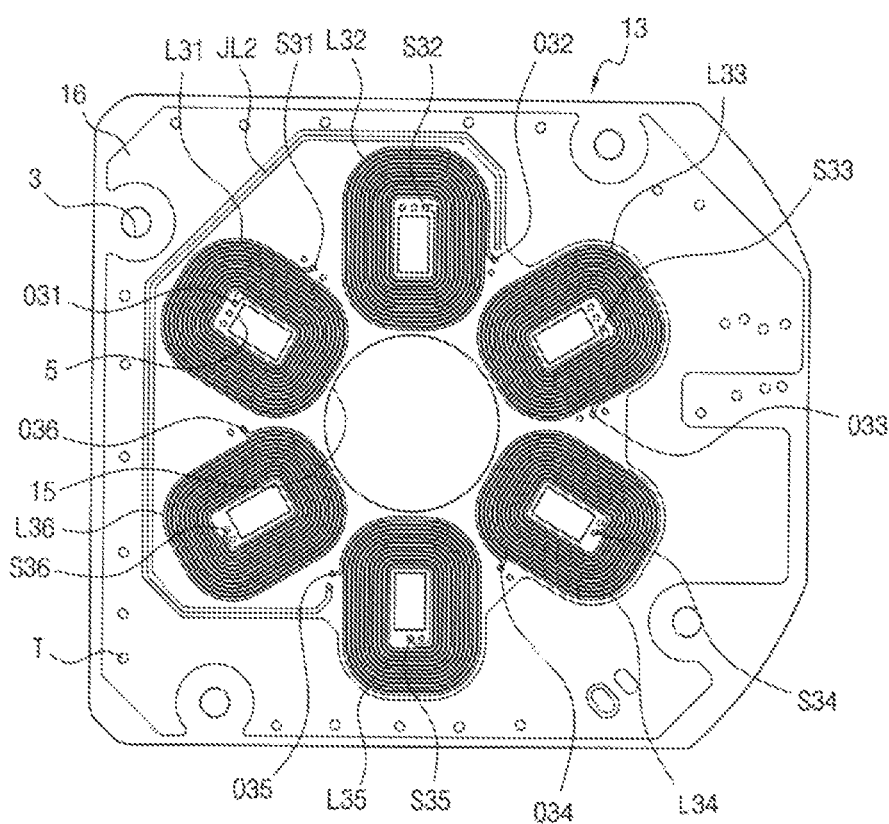
Figure 11D:
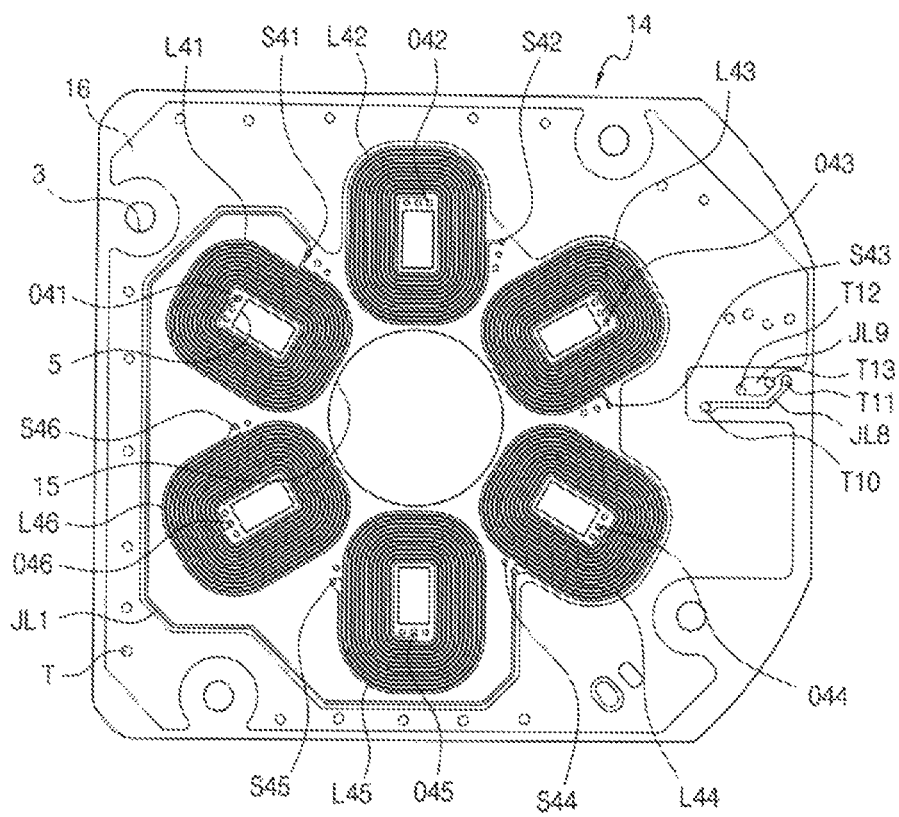
Figure 12:
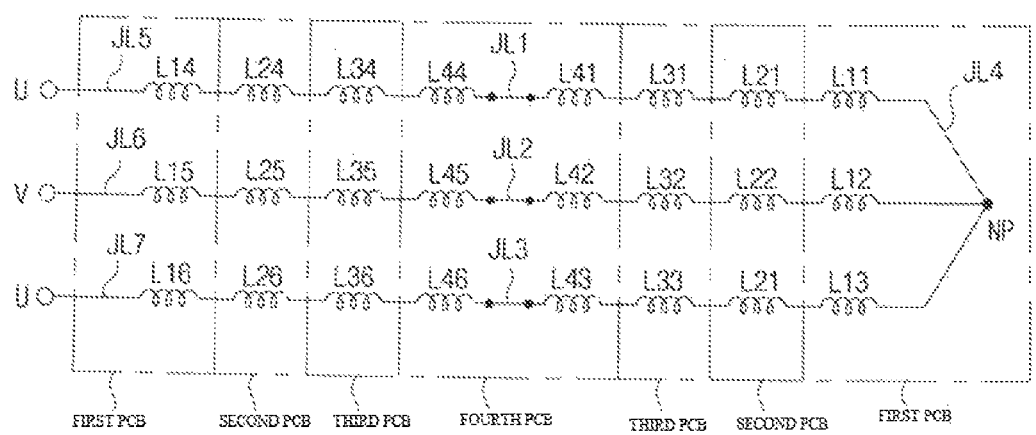
FIG. 12 is an equivalent circuit diagram of stator coils in the stack-type stator shown in FIGS. 11A to 11D.

FIGS. 11A to 11D are plan views showing a stack-type stator having stator coils in a series connection structure in the stack-type stator according to the second embodiment of the present invention, and FIG. 12 is an equivalent circuit diagram of a stator coil in the stack-type stator according to the second embodiment.

In the stack-type stator according to the second embodiment of the present invention, a plurality of coil patterns are wired in a series connection structure instead of a parallel connection structure, and are connected in a Y-connection manner.

Therefore, the same elements of the second embodiment as those of the first embodiment are given the same reference numerals as those of the first embodiment, and a detailed description thereof will be omitted.

When the BLDC motor 100 is driven in a three-phase BLDC scheme and has, for example, a six-slot/eight-pole structure, the stack-type stator 10*a* according to an embodiment of the present invention may be configured as a multi-layer substrate in which twenty-four coil patterns L11 to L16, L21 to L26, L31 to L36, and D41 to L46 have a series connection structure and PCBs are stacked in four layers.

The stack-type stator 10*a* is configured such that twenty-four coil patterns L11 to L16, L21 to L26, L31 to L36, and L41 to L46 are disposed six by six for first to third PCBs 11 to 14 of a four-layer structure as shown in FIGS. 11A to 11D, respectively, and are connected in a Y-connection manner by using the wiring patterns JL1 to JL9 formed in the coil pattern forming area 16*a* of the first to fourth PCBs 11 to 14, in place of the wiring PCB.

The coil patterns are arranged at intervals of 60 degrees around the through hole 15, and the coil patterns L11 to L16, L21 to L26, L31 to L36, and L41 to L46 are alternately arranged into coil patterns of U, V, and W phases for each layer. For example, coil patterns L11 to L13 for U, V and W phases are arranged from the left side to the right side of the upper side of the first PCB 11, and coil patterns L14 to L16 for U, V and W phases are arranged from the right side to the left side of the lower side of the first PCB 11, in which the coil patterns for U, V and W phases face each other around the through hole 15.

In the first to fourth PCBs 11 to 14, the coil patterns L11, L21, and L31 is connected to the wiring pattern JL4 so that a neutral point (NP) is formed by commonly connecting one end of the respective three-phase (U, V, W) coil patterns L11, L21 and L31 so as to be connected in a T-connection method.

In the following description of the second embodiment, the start portion and the end portion with respect to the 24 coil patterns L11 to L16, L21 to L26, L31 to L36 and L41 to L46 connected to the wiring pattern JL4 are named on the basis of the neutral point (NP).

The three leading ends extending from the wiring pattern JL4 are connected to the start portions S11 to S13 of the coil patterns L11, L21 and L31 and the end portions O11 To O13 thereof are disposed inside the coil patterns L11, L21 and L31.

The stack-type stator 10*a* according to the present invention including stator coils having a series connection structure has eight coil patterns L11 to L16, L21 to L26, L31 to L36, and L41 to L46 disposed for each phase (U, V, W), as shown in FIG. 12, and the six coil patterns arranged at the same position over the four layers constitute one serial circuit for each phase by using the wiring patterns JL1 to JL9.

In order to configure the eight coil patterns L11 to L16, L21 to L26, L31 to L36, and L41 to L46 for each phase (U, V, W) as one serial circuit, two or three conductive through holes are disposed adjacent to the start portion and the end portion of each of the coil patterns L11 to L16, L21 to L26, L31 to L36, and L41 to L46, and a series connection is made between the coil pattern arranged on the upper side of the through hole and the coil pattern arranged on the lower side of the through hole by alternately using the conductive through holes.

For example, a structure in which eight coil patterns L11, L21, L31, L41, L44, L34, L24, and L14 belonging to the U phase are connected in series will be described.

First, one leading end portion extending from the wiring pattern JL4 forming the neutral point NP like the first PCB 11 shown in FIG. 11A is connected to the start portion S11 located outside the coil pattern L11, and the end portion O11 is connected to one of the three through holes disposed inside the coil pattern L11.

The end portion O11 of the coil pattern L11 is connected to the start portion S21 located inside the coil pattern L21 like the second PCB 12 shown in FIG. 11B through the through hole, and the end portion O21 is connected to one of the three through holes disposed outside the coil pattern L21.

The end portion O21 of the coil pattern L21 is connected to the start portion S31 located outside the coil pattern L31 like the third PCB 13 shown in FIG. 11C through the through hole, and the end portion O31 is connected to one of the three through holes disposed inside the coil pattern L31.

The end portion O31 of the coil pattern L31 is connected to the start portion S41 located inside the coil pattern L41 like the fourth PCB 14 shown in FIG. 11D through the through hole, and the end portion O41 is connected to one of the three through holes disposed outside the coil pattern L41.

The end portion O41 of the coil pattern L41 is connected to the start portion S44 located outside the coil pattern L44 disposed on the lower side of the fourth PCB 14 through the wiring pattern JL1, and the end portion O44 thereof is connected to one of the three through holes disposed inside the coil pattern L44.

The end portion O44 of the coil pattern L44 is connected to the start portion S34 located inside the coil pattern L34 like the third PCB 13 shown in FIG. 11C through the through hole, and the end portion O34 thereof is connected to one of the three through holes disposed outside the coil pattern L34.

The end portion O34 of the coil pattern L34 is connected to the start portion S24 located outside the coil pattern L24 like the second PCB 12 shown in FIG. 11B through the through hole, and the end portion O24 thereof is connected to one of the three through holes disposed inside the coil pattern L24.

The end portion O24 of the coil pattern L24 is connected to the start portion S14 located inside the coil pattern L14 like the first PCB 11 shown in FIG. 11A through the through hole, and the end portion of the coil pattern L14 is connected to the wiring pattern JL5 without passing through any through holes.

The leading end portion of the wiring pattern JL5 is connected to the wiring pattern JL8 shown in the fourth PCB 14 in FIG. 11D through the through hole T10, and the leading end of the wiring pattern JL8 is connected to the U-phase output terminal U of the motor drive circuit 50, that is, the motor drive chip 50*a*, shown in the first PCB 11 of FIG. 11A through the through hole T11.

The V-phase coil patterns L12, L22, L32, L42, L45, L35, L25, and L15 and the W-phase coil patterns L13, L23, L33, L43, L46, L36, L26, and L16 are also formed in series in the same manner as the U-phase coil patterns L11, L21, L31, L41, L44, L34, L24, and L14.

A plurality of through holes and wiring patterns JL2, JL4 and JL6 are used for series connection of the V-phase coil patterns L12, L22, L32, L42, L45, L35, L25 and L15, and a plurality of through holes T12 and T13 and wiring patterns JL3, JL4, JL7 and JL9 are used for series connection of the W-phase coil patterns L13, L23, L33, L43, L46, L36, L26 and L16.

The BLDC motor 100 can be configured by combining the stack-type stator 10a and the rotor 20 according to the second embodiment described above.

When the BLDC motor 100 is controlled to be driven in a six-step manner, and when the rotor position is 0°, the motor drive circuit 50 is controlled to perform a current flow control so that the current returns to the W-phase output terminal W via the wiring pattern JL4 and the W-phase coil patterns L13,L23,L33,L43,L46,L36,L26, and L16 in sequence, after passing through the U-phase coil patterns L11,L21,L31,L41,L44,L34,L24, and L14 from the U-phase output terminal U.

When the current flows as described above, for example, the long-side pattern portion (or the radial direction pattern portion) that are located on both sides along the long side of the rectangular through hole 5 in the four coil patterns L14, L24, L34, and L44 and the four coil patterns L11, L21, L31, and L41 located at the same position has the position opposite to the magnet of the rotor at the same time, and the flow direction of the current is set to be the same, to generate a combined torque. The long-side pattern portion (or the radial direction pattern portion) are oriented in the radial direction (i.e., normal direction) perpendicular to the rotational direction (circumferential direction) of the rotor 20, and tangential forces F are generated from the radial direction pattern portions in accordance with Fleming's left-hand rule.

In addition, the current flow direction is set identically in the four coil patterns L13, L23, L33, and L43 and the four coil patterns L16, L26, L36, and L46 arranged at the same position, to thus generate a combined torque. The long-side pattern portion (or the radial direction pattern portion) are oriented in the radial direction (i.e., normal direction) perpendicular to the rotational direction (circumferential direction) of the rotor 20, and tangential forces F are generated from the radial direction pattern portions in accordance with Fleming's left-hand rule.

As a result, the rotor 20 disposed in opposition to the stack-type stator 10 is rotated.

Thereafter, when the rotor rotates by 60 degrees and the rotor position is detected by a Hall sensor, the motor drive circuit 50 switches the output terminal. By setting the current flow path so that the drive current flows through the W-phase coil patterns L13, L23, L33, and L43; L16, L26, L36, and L46 from the V-phase coil patterns L15, L25, L35, and L45; L12, L22, L32, and L42, the rotation of the rotor continues.

As described above, in the case of a motor requiring a high drive RPM and drive torque as in the embodiments of the present invention, a plurality of coil patterns are connected in parallel. In the case of a motor suitable for a low drive RPM with low power consumption, a plurality of coil patterns can be connected in series and connection methods of the plurality of coil pattern can be selected depending on the use of the motor.

In the embodiments of the stack-type stators 10 and 10a, the case where the motor drive circuit 50 is formed integrally on the side surface of the first PCB, has been described. However, it is of course possible to reduce the size of the multi-layer PCB by placing the motor drive circuit on the lowermost PCB or placing it on the lowermost PCB which is further stacked.

In addition, in the embodiments of the stack-type stators 10 and 10a, the case where the BLDC motor 100 is driven by a three-phase BLDC method and is connected in a Y-connection manner, has been described. However, the stack-type stator of the present invention is not limited to this, and may be deformed so as to perform other types of wiring and driving such as delta wiring.

Furthermore, in the divided cores according to the embodiments shown in the drawings, the case where a plurality of thin flakes each composed of a shoe portion and a tooth portion having a round shape are stacked in the leading ends of the divided cores, has been described, but other types of thin flakes can be stacked.

In this case, it is difficult to freely design the shape of the divided cores in which the thin flakes are laminated, but it is also possible to apply an integral core. That is, the integral cores may be integrally formed by compression-molding, for example, a mixture of an amorphous metal powder and a spherical soft magnetic powder, an amorphous metal powder or a soft magnetic powder, together with a binder, so that the shapes of the shoe portions and the tooth portions can be freely designed.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

The present invention relates to a stack-type stator formed by forming coil patterns on a multi-layer substrate, and a motor and a blower using the same, and is applied to a vehicle air purifier system (VAPS).

What is claimed is:

1. A stack-type stator comprising: a multi-layer substrate having a plurality of first through holes; a plurality of coil patterns formed on respective substrates of the multi-layer substrate and each respectively surrounding the plurality of first through holes and forming a plurality of turns; a stator yoke disposed at a lower portion of the multi-layer substrate and having a plurality of second through holes each respectively at a position corresponding to each first through hole; and plurality of divided cores each having one side protruding above a respective coil pattern formed on the uppermost layer of the multi-layer substrate and the other side being coupled to the corresponding second through hole of the stator yoke through the first through hole of the multi-layer substrate, wherein the plurality of the first and second through holes and the coil patterns are each in a fan shape and the coil pattern comprises a pair of radial pattern portions arranged along the radial direction.

2. The stack-type stator of claim 1, wherein the divided core comprises:
a shoe portion protruding over the coil pattern formed on the uppermost layer of the multi-layer substrate; and
a tooth portion extending from the shoe portion and having a distal end coupled to the second through hole of the stator yoke through the first through hole of the multi-layer substrate.

3. The stack-type stator of claim 1, wherein the divided core comprises a stack-type structure in which a plurality of iron pieces are laminated or an integral type structure in which metal powder is compression molded.

4. The stack-type stator of claim 3, wherein the integral type divided core is formed of a crystalline metal powder, an amorphous alloy powder, or a mixed powder of a crystalline metal powder and an amorphous alloy powder.

5. The stack-type stator of claim 4, wherein the coil pattern comprises any one of a polygonal shape, a circular shape, and a fan shape.

6. The stack-type stator of claim 1, wherein the plurality of coil patterns are connected by a three-phase Y-connection method, and the plurality of coil patterns arranged on respective phases are connected in parallel or in series.

7. The stack-type stator of claim 6, wherein, when the plurality of coil patterns are connected in series, six coil patterns are arranged at intervals of 60° on each substrate of the multi-layer substrate, the coil patterns arranged at an identical position on each substrate are connected in series through conductive through holes, and the coil patterns arranged in opposition to each other around a center are connected in series through the conductive through holes.

8. The stack-type stator of claim 7, wherein the multi-layer substrate is formed of first to fourth printed circuit boards (PCBs), a first wiring pattern necessary for three-phase Y-connection is formed on the first PCB, and second to fourth wiring patterns for connecting the coil patterns arranged in opposition to each other around the center are formed on second to fourth PCBs.

9. The stack-type stator of claim 6, wherein, when the plurality of coil patterns are connected in parallel, six coil patterns are arranged at intervals of 60° on each substrate of the multi-layer substrate, the coil patterns arranged at an identical position on each substrate are connected in parallel through conductive through holes, and the coil patterns arranged in opposition to each other around a center are connected in series through the wiring patterns.

10. The stack-type stator of claim 1, further comprising a motor drive circuit disposed on one side of the uppermost substrate of the multi-layer substrate and applying a driving current to the coil patterns.

11. A slim motor comprising: a base plate; a support shaft having one end fixed to the base plate; a bushing rotatably supported on the support shaft; a rotor having a central portion of a back yoke coupled to an outer periphery of the bushing and a plurality of magnets disposed at a lower portion of the back yoke; and a stack-type stator disposed above the base plate so as to face the rotor, wherein the stack-type stator comprises: a multi-layer substrate having a plurality of first through holes; a plurality of coil patterns formed on respective substrates of the multi-layer substrate and each respectively surrounding the plurality of first through holes and forming a plurality of turns; a stator yoke disposed at a lower portion of the multi-layer substrate and having a plurality of second through holes each respectively at a position corresponding to each first through hole; and plurality of divided cores each having one side protruding above a respective coil pattern formed on the uppermost layer of the multi-layer substrate and the other side being coupled to the corresponding second through hole of the stator yoke through the first through hole of the multi-layer substrate, and wherein the corresponding first and second through holes are arranged in a radial direction in a rectangular shape, the divided core is formed of a plurality of iron pieces laminated along the radial direction, and the plurality of iron pieces each comprises one side protruding from both ends thereof in a round shape to form a shoe portion, and the other side protruding in a rectangular shape to form a tooth portion.

12. The slim motor of claim 11, wherein the slim motor is driven by a three-phase BLDC method.

13. The slim motor of claim 11, wherein the base plate is made of a non-magnetic material.

14. The slim motor of claim 13, wherein the stator yoke comprises: an annular portion having the plurality of second through holes at a position each corresponding to the respective first through holes; and a plurality of extensions extending radially from the annular portion and having a leading end supported on the base plate.

15. A blower for an air purification system comprising:
an axial gap type motor; and an impeller coupled to the axial gap type motor to suck air in a vehicle,
wherein the axial gap type motor comprises:
a stack-type stator disposed above a base plate; and
a rotor disposed in opposition to the stack-type stator with an air gap above the stack-type stator,
wherein the stack-type stator comprises:
a multi-layer substrate having a first through hole;
a coil pattern formed on the respective substrates of the multi-layer substrate and to surround the first through hole and to form a plurality of turns;
a stator yoke disposed at a lower portion of the multi-layer substrate and having a second through hole at a position corresponding to the first through hole; and
a divided core having one side protruding above the coil pattern formed on the uppermost layer of the multi-layer substrate and the other side being coupled to the second through hole of the stator yoke through the first through hole of the multi-layer substrate,
wherein the base plate is a stator yoke, and
wherein the first and second through holes are arranged in a radial direction in a rectangular shape, the divided core is formed of a plurality of iron pieces laminated along the radial direction, and the plurality of iron pieces each comprises one side protruding from both ends thereof in a round shape to form a shoe portion, and the other side protruding in a rectangular shape to form a tooth portion.

* * * * *